(12) United States Patent
Weiss et al.

(10) Patent No.: US 8,020,449 B2
(45) Date of Patent: Sep. 20, 2011

(54) PRESSURE SENSOR WITH SECONDARY SEAL

(75) Inventors: Jason Weiss, Edmonton (CA); Brian Bruchal, Edmonton (CA); William MacDonald, Edmonton (CA)

(73) Assignee: Argus Machine Co. Ltd., Edmonton (CA)

( * ) Notice: Subject to any disclaimer, the term of this patent is extended or adjusted under 35 U.S.C. 154(b) by 483 days.

(21) Appl. No.: 12/190,555

(22) Filed: Aug. 12, 2008

(65) Prior Publication Data

US 2010/0037697 A1    Feb. 18, 2010

(51) Int. Cl.
  *G01L 7/08*    (2006.01)
(52) U.S. Cl. ............................ 73/715; 73/723
(58) Field of Classification Search .................. None
  See application file for complete search history.

(56) References Cited

U.S. PATENT DOCUMENTS

| | | | | |
|---|---|---|---|---|
| 3,422,324 | A * | 1/1969 | Harrison, Jr | 361/283.4 |
| 4,007,343 | A | 2/1977 | Alten | |
| 5,181,423 | A * | 1/1993 | Philipps et al. | 73/724 |
| 5,287,746 | A * | 2/1994 | Broden | 73/706 |
| 5,670,766 | A | 9/1997 | Ellett | |
| 5,744,771 | A | 4/1998 | Ellett | |
| 7,252,010 | B2 * | 8/2007 | Ohta et al. | 73/754 |
| 7,313,970 | B2 * | 1/2008 | Nonaka et al. | 73/756 |

OTHER PUBLICATIONS

The Instrumentation, Systems, and Automation Society (ISA), "Requirements for Process Sealing Between Electrical Systems and Flammable or Combustible Process Fluids," ANSI/ISA-Dec. 27, 2001-2003, Feb. 2, 2003, 16 pages.

* cited by examiner

*Primary Examiner* — Lisa Caputo
*Assistant Examiner* — Jermaine Jenkins
(74) *Attorney, Agent, or Firm* — Christensen O'Connor Johnson Kindness PLLC

(57) ABSTRACT

An apparatus for sensing pressure is provided comprising a housing, electronics, a pressure sensor and a secondary seal. The housing comprises an interior bore and a first end, with the interior bore forming an opening at the first end. The electronics may be disposed in the interior bore. The pressure sensor is mounted at the first end of the interior bore. The pressure sensor may be operatively connected to send signals to the electronics in response to external fluid pressure. The pressure sensor may, at least in part, form a primary seal at the first end of the interior bore. The secondary seal may be disposed in the interior bore in between the pressure sensor and the electronics. The secondary seal may be configured to act as a backup seal to the primary seal. The secondary seal provides an added degree of safety from high pressure pipeline contents. The secondary seal also ensures that the important interior electrical components of the apparatus are not damaged upon failure of any component located at the first end. If the pressure sensor or primary seal is damaged, for example, a new pressure sensor or primary seal may be installed without having to replace the entire apparatus. The secondary seal also prevents fluid from a high pressure pipeline that has compromised the primary seal from being ejected from the pipeline. The secondary seal also prevents pipeline media from migrating through the electrical cable to a non-hazardous location.

14 Claims, 5 Drawing Sheets

PRESSURE SENSOR WITH SECONDARY SEAL

TECHNICAL FIELD

This document relates to pressure sensors.

BACKGROUND

U.S. Pat. No. 4,007,343 discloses a method and apparatus for sensing fluid pressure. This device has a pressure gauge with a digital readout, and a flexible diaphragm that responds to changing pressure.

SUMMARY

An apparatus for sensing pressure is provided comprising a housing, an electronics unit in the housing, a pressure sensor and a secondary seal. The housing comprises an interior bore and a first end, with the interior bore forming an opening at the first end. The electronics unit may be disposed in the interior bore. The pressure sensor is mounted at the first end of the interior bore. The pressure sensor is operatively connected to send signals to the electronics unit in response to external fluid pressure. The pressure sensor, at least in part, forms a primary seal at the first end of the interior bore. The secondary seal is disposed in the interior bore in between the pressure sensor and the electronics. The secondary seal acts as a backup seal to the primary seal.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which.

DETAILED DESCRIPTION

A device connected to a fluid conduit to measure properties of hazardous fluids contained within the fluid conduit may pose safety problems if they are not properly sealed and protected. Sometimes the fluid media (gases usually) can migrate between the conductor wires and insulating jacket on an electrical wire communicating with such a device. This media can then travel the entire length of the electrical wire into an area that is not protected with "hazardous location" equipment (eg: an electrical panel many feet away from the transmitter that does not require Class 1, Division 1 protection).

Figure 1:
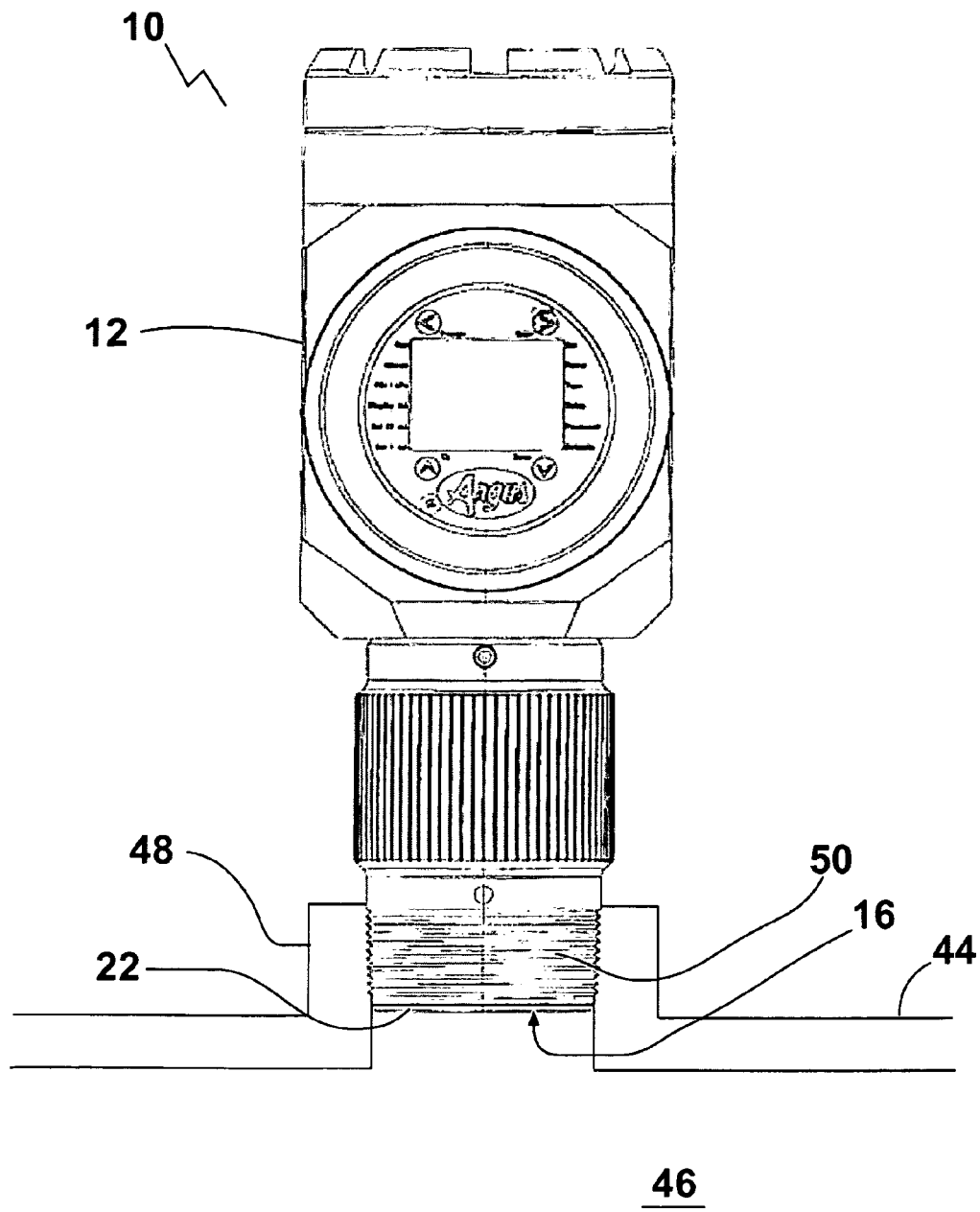
FIG. 1 is a side elevation view of a pressure sensor.
Figure 2:
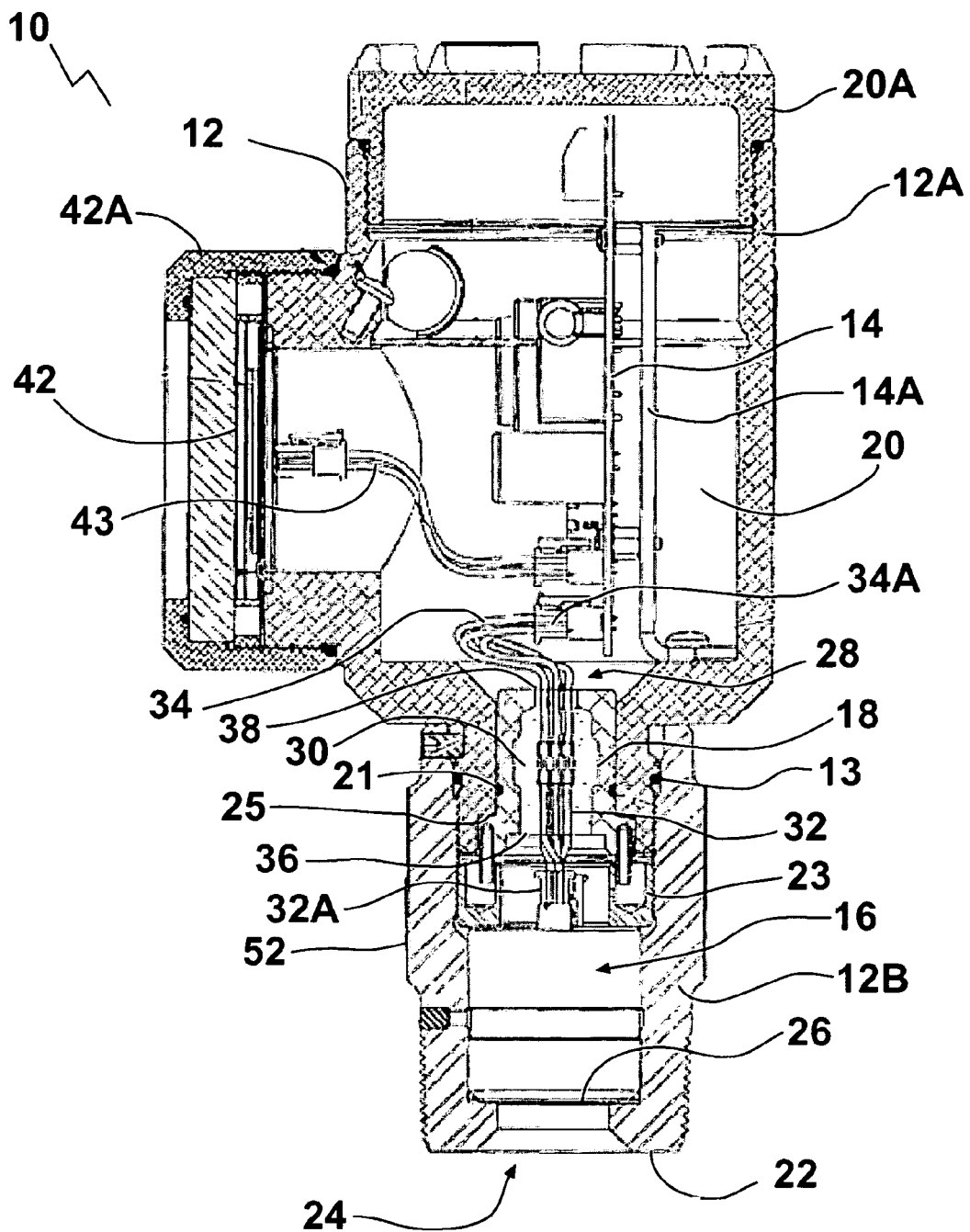
FIG. 2 is a side elevation view, partially in section of the pressure sensor of FIG. 1.

Referring to FIG. 1, an apparatus for sensing pressure, generally referred to by the reference numeral 10, is illustrated. Referring to FIG. 2, apparatus 10 comprises a housing 12, electronics unit 14 in the housing supported by plate 14A, a pressure sensor 16, and a secondary seal 18. Housing 12 comprises an interior bore 20 and a first end 22. The housing 12 is formed of two parts in this example, an electronics housing 12A and a pressure sensor housing 12B that are threaded together with a seal 13 between them external to the threads. Interior bore 20 forms an opening 24 at first end 22. The electronics housing 12A is capped by end cap 20A through which connections to an external device are made in conventional fashion. The electronics unit 14 is disposed in interior bore 20. Pressure sensor 16 may be mounted at first end 22 of interior bore 20, pressure sensor 16 being operatively connected to send signals to electronics 14 in response to external fluid pressure. Electronics unit 14, for example, is configured to send output signals corresponding to the external fluid pressure. For example, the output signal may continually send external fluid pressure data. In other embodiments, the output signal corresponds to the external fluid pressure being outside of an adjustable range. For example, if the external fluid pressure is above an upper limit of the adjustable range, or below a lower limit of the adjustable range, an output signal will be sent. The output signal may be, for example, an electrical or wireless signal. In other embodiments, the output signal may contain data that corresponds to characteristics of the external fluid. For example, the output signal may contain temperature or pressure readings.

Referring to FIG. 2, in one embodiment electronics unit 14 may comprise various pieces of standard electronic equipment, including for example a microprocessor, an A/D converter, a display driver, a power converter, an output driver, and/or a battery. The microprocessor is used, for example, to perform calculations, interpret signal data, and control the various components of electronics 14. The A/D converter is provided for converting analog signals into digital signals, and vice versa. The display driver is provided to control a display 42 that is held in an opening of the electronics housing 12A by a threaded sleeve 42A. The power converter is provided for converting the input voltage from either the battery or a wall outlet into a suitable voltage to be used by apparatus 10. The output driver is provided to convert the digital pressure signal into a useable output signal to control equipment (not shown) to which the pressure sensor 10 is electrically attached.

Pressure sensor 16 may form, at least in part, a primary seal at first end 22 of interior bore 20. The primary seal is configured to prevent external fluids from entering interior bore 20. In some embodiments, pressure sensor 16 may comprise a flexible diaphragm 26 mounted at first end 22 of interior bore 20. Flexible diaphragm 26 may form at least part of the primary seal. In further embodiments, the primary seal may be provided distinct from pressure sensor 16. The primary seal may be mounted at first end 22 of interior bore 20, the primary seal configured to prevent external fluids from entering interior bore 20.

Referring to FIG. 2, secondary seal 18 is disposed in interior bore 20 in between pressure sensor 16 and electronics unit 14. Secondary seal 18 acts as a backup seal to the primary seal. Pressure sensor 16 is operatively connected to electronics unit 14 through conductive paths 28. The secondary seal 18 is formed within a seal housing 19 that is sealed to a neck of the electronics housing 12A by an O-ring seal 21. The secondary seal 18 is held in place by pressure between a shoulder 25 on the neck of the electronics housing 12A and threaded sleeve 23 that is threaded into the pressure sensor housing 12B. Fasteners such as screws may secure the sleeve 23 to the seal housing 19.

Figure 3:
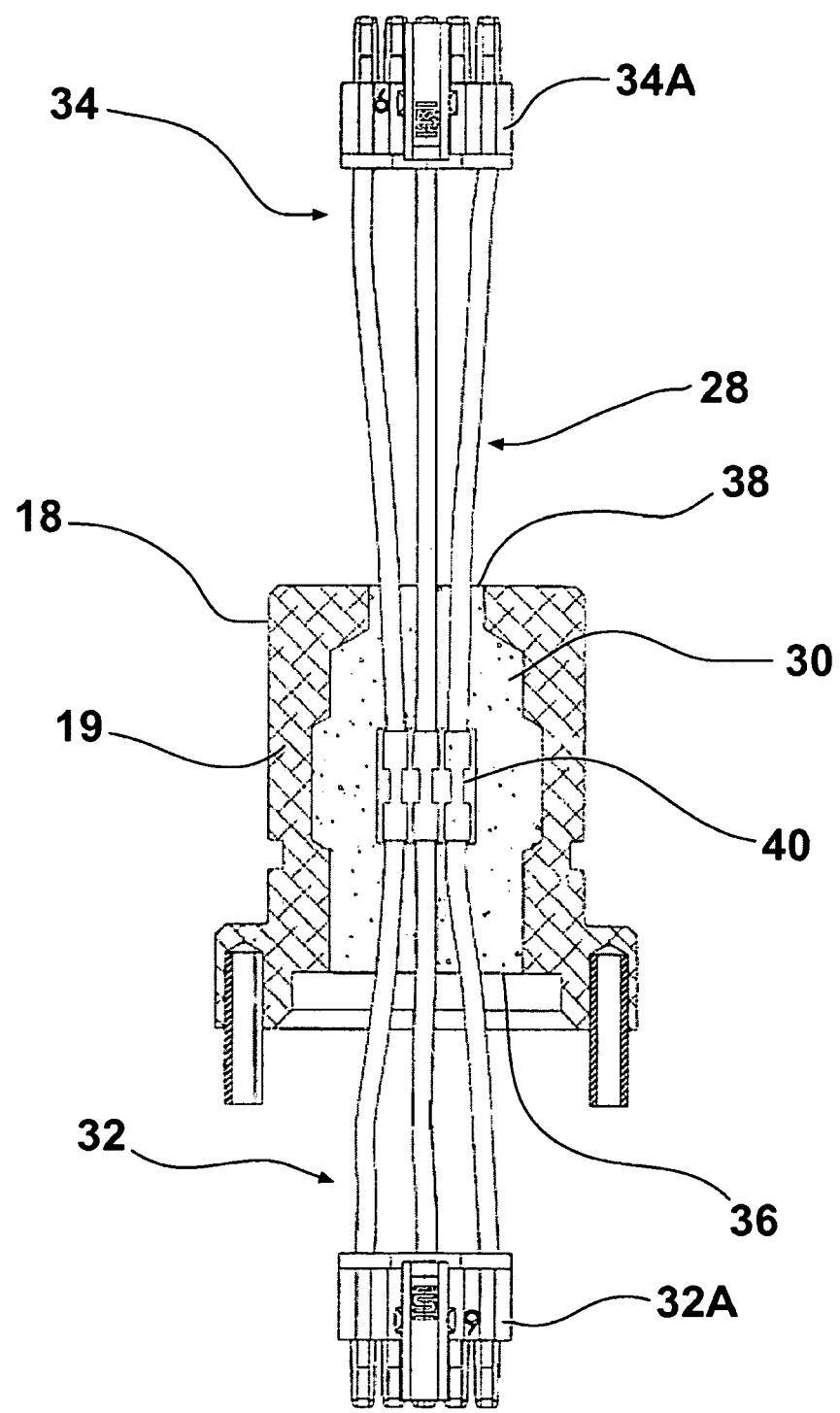
FIG. 3 is a side elevation view, in section, of the secondary seal of the pressure sensor of FIG. 1.

Referring to FIG. 2, secondary seal 18 may comprise potted material forming a seal around exposed portions of conductive paths 28. The potted material may for example be a polyurethane but other suitable electrically insulating and pressure resistant materials may be used. Referring to FIG. 3, the seal may be in the form of a potted seal 30 around conductive paths 28. Conductive paths 28 may comprise a sensor end 32, with a connector 32A that is received by a corresponding connector on the pressure sensor 16, and an electronics end 34. with a connector 34A that plugs into a corresponding connector on the electronics unit 14. Referring to FIG. 3, potted seal 30 may comprise a sensor side 36 and an electronics side 38. Referring to FIG. 2, sensor and electronics sides 36 and 38, respectively, are oriented towards pressure sensor 16 and electronics unit 14, respectively. Referring to FIG. 3, sensor end 32 enters secondary seal 18 from sensor side 36, while electronics end 34 enters secondary seal 18 from electronics side 38. Sensor end 32 and electronics end 34 may be in electrical communication with one another through at least one junction 40 disposed at least partly within potted seal 30.

Figure 4:
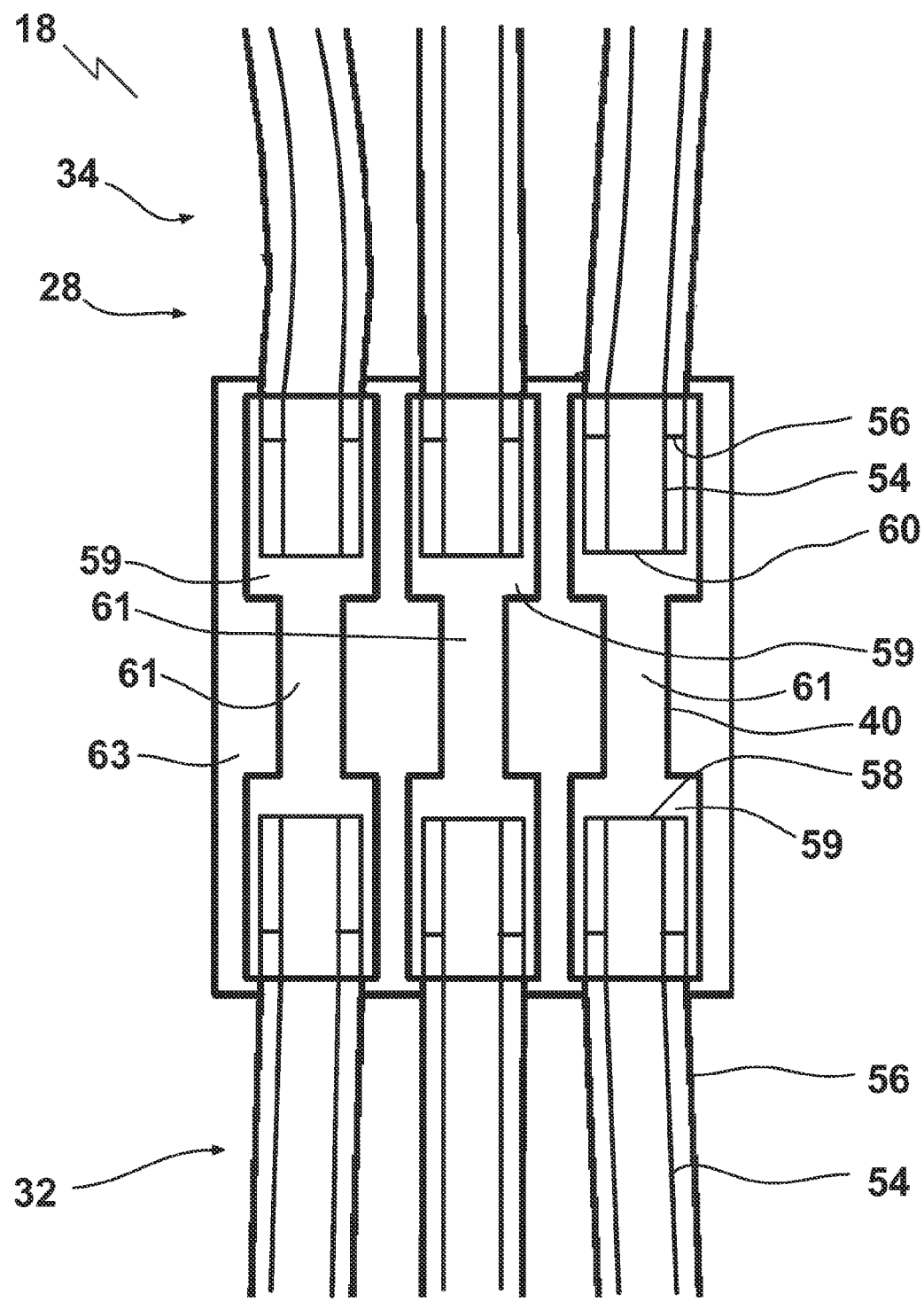
FIG. 4 is a top plan view of the secondary seal shown in FIG. 3.

Referring to FIG. 4, in some embodiments, conductive paths 28 may comprise three wires 54, each insulated by a respective sheath 56. Referring to FIG. 5C, in some embodiments, conductive paths 28 may comprise, for example, six wires 54. Referring to FIG. 4, in the embodiment shown, only three wires 54 are illustrated, however the other three wires 54 may be positioned on the other side (not shown) of insulated base 63. It should be understood that any number of wires 54 are possible. The wires 54 of sensor and electronics ends 32 and 34 are secured, as by soldering, to respective first end 58 and second end 60 of metal connectors 59 forming junction 40. Potted material forms a dense seal around the bare metal surface of junction 40, on all exposed sides, and presses up against the metal of a central portion 61 of the metal connectors 59 thus preventing any fluid that has managed to travel up sheath 56 from passing through secondary seal 18. The metal connectors 59 may be adhered to a circuit board or other insulated base 63. The base 63 prevents fluid migration because the fluids cannot span the base 63 and travel down the conductive paths 28.

Figure 5A:
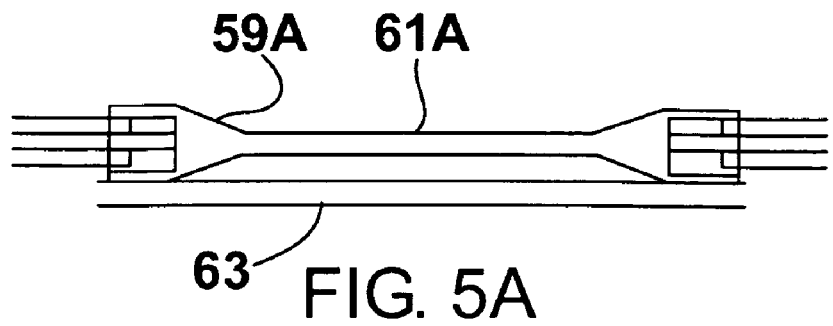
FIGS. 5A-5B are side elevation views, in section, of a junction of the secondary seal of FIG. 3.
Figure 5B:
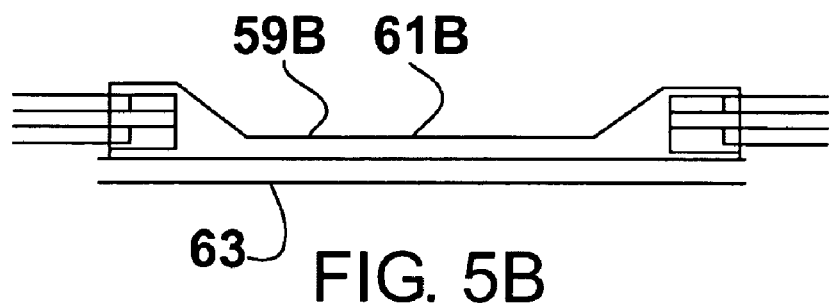
Figure 5C:
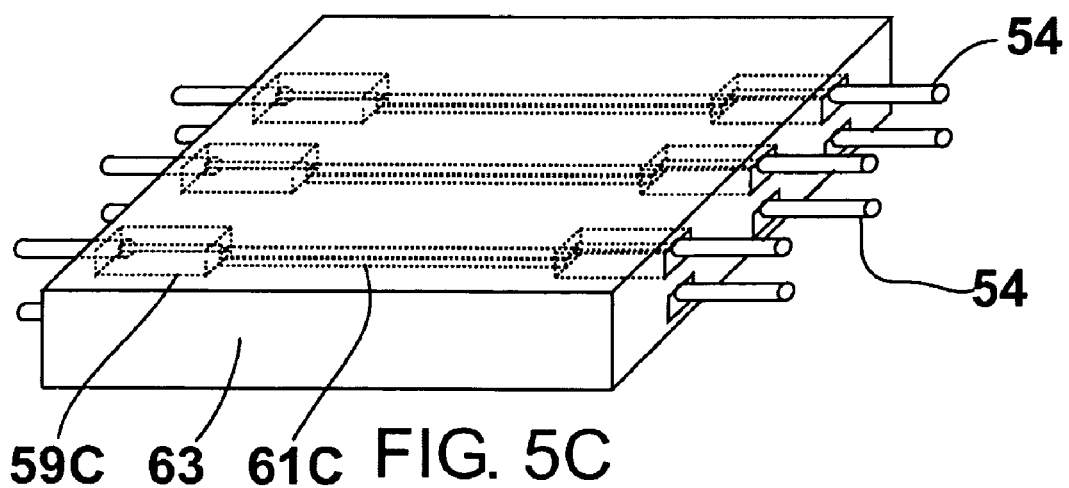
FIG. 5C is a perspective view, partially in section, of a further junction of the secondary seal of FIG. 3 illustrating six wires.

Referring to FIG. 5A, central portions 61A of metal connectors 59A may be lifted off a flat surface of insulated base 63. In embodiments where the metal connectors 59 are lifted off the base 63, the potted material flows all around the connectors 59 to provide the secondary seal. In embodiments where the metal connectors 59, or at least their central portions 61, as illustrated by metal connectors 59B with central portions 61B in FIG. 5B, are part of or adhered to the base 63, the secondary seal is provided by potted material abutting against the top and sides of central portions 61B and the base 63, as well as the adhesion of the central portion 61B to the base 63. Referring to FIG. 5C, metal connectors 59 may be formed of conductive strips 59C with central portions 61C sealed within or forming part of the insulated base 63. In another embodiment, the sheaths 56 of wires 54 may be stripped off and the potted material adhered directly to the bare wires 54. In this case, the metal connectors 59 forming the junction 40 may not be necessary. A separator may be required to keep the bare wires 54 from touching each other. In the embodiment illustrated, only the top 3 wires 54 are illustrated by ghost lines, although it should be understood that the bottom three wires 54 may be arranged in a similar, if not identical, fashion.

Referring to FIG. 2, display 42 may be operatively connected to electronics unit 14 by conventional connector 43. Display 42 may be configured to display data received from electronics unit 14. In some embodiments, display 42 comprises a digital display.

Referring to FIG. 1, apparatus 10 may be installed on a pipeline 44. Pipeline 44 may contain fluid 46, fluid 46 being at least one of a gas or liquid. Housing 12 may be tightly installed into an access conduit 48 of pipeline 44 using threading 50 adjacent first end 22. When installed, first end 22 may be in fluid communication with the interior contents of pipeline 44. When in use, the pressure from fluid 46 deflects pressure sensor 16. This deflection may be measured by a strain gauge (not shown) affixed to the inside of pressure sensor 16. In one embodiment, an exemplary strain gauge may be arranged as a Wheatstone bridge circuit. The strain gauge may deform under the pressure, and the deformation may be converted into a signal. In some embodiments, this signal may be, for example, generated by a change in electrical resistance across the Wheatstone bridge. The signal is then transmitted as an analog signal through conductive paths 28 to electronics unit 14. The signal is converted into a digital signal by electronics unit 14. The digital signal may then be converted into a pressure value and displayed. The pressure value may correspond to the pressure of fluid 46 within pipeline 44 (as shown in FIG. 1). Electronics unit 14 may send the pressure value to display 42, where it may be displayed. In some embodiments, the pressure value may be provided, for example, in pounds per square inch or kilopascals. In further embodiments, the pressure value may be transmitted for remote monitoring for example, as a 4-20 mA signal. Control of the adjustable range may be accomplished by manual or remote programming of relays on electronics unit 14. When the pressure of fluid 46 is detected as being outside the adjustable range, the output signal is sent. The output signal may actuate an alarm, or may be transmitted to equipment that may control the pressure of fluid 46 within pipeline 44. An example may include an emergency pipeline shutdown device.

Referring to FIG. 2, in some embodiments, housing 12 may be made up of multiple pieces. In some embodiments, housing 12 may comprise a removable component 52 at first end 22. Removable component 52 may house pressure sensor 16. Removable component 52 may be replaced in the event of the failure of, for example, pressure sensor 16 and/or the primary seal.

Secondary seal 18 provides an added degree of safety from high pressure pipeline contents. Secondary seal 18 also prevents pipeline contents from migrating out of the conduit system, for example through the electrical cable. Secondary seal 18 also ensures that the important interior electrical components, for example electronics unit 14, of apparatus 10 are not damaged upon failure of any component located at first end 22. If pressure sensor 26 or the primary seal is damaged, for example, a new pressure sensor 16 or primary seal may be installed without having to replace the entirety of apparatus 10. Secondary seal 18 also prevents fluid from a high pressure pipeline that has compromised the primary seal from being ejected from the pipeline.

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims. Immaterial modifications may be made to the embodiments described here without departing from what is covered by the claims.

What is claimed is:

1. An apparatus for sensing pressure, comprising:
a housing, the housing comprising an interior bore and a first end, the interior bore forming an opening at the first end;
electronics disposed in the interior bore;
a pressure sensor mounted at the first end of the interior bore, the pressure sensor operatively connected to send signals to the electronics in response to external fluid pressure, the pressure sensor at least in part forming a primary seal at the first end of the interior bore, and the pressure sensor being operatively connected to the electronics through conductive paths; and
a secondary seal disposed in the interior bore between the pressure sensor and the electronics, the secondary seal being a backup seal to the primary seal, and the secondary seal comprising potted material forming a seal around bare metal portions of the conductive paths.

2. The apparatus of claim 1 further comprising:
a display operatively connected to the electronics, the display being configured to display data received from the electronics.

3. The apparatus of claim 2 wherein the display comprises a digital display.

4. The apparatus of claim 1 wherein the electronics is configured to send output signals corresponding to the external fluid pressure.

5. The apparatus of claim 4 in which the output signals correspond to the external pressure being outside of an adjustable range.

6. The apparatus of claim 1 wherein the pressure sensor comprises a flexible diaphragm mounted at the first end of the interior bore, and the flexible diaphragm forms at least part of the primary seal.

7. The apparatus of claim 1 wherein the conductive paths include a junction between wires, the junction having a bare metal surface around which potted material forms a seal.

8. An apparatus for sensing pressure, comprising:
a housing, the housing comprising an interior bore and a first end, the interior bore forming an opening at the first end;
electronics disposed in the interior bore;
a pressure sensor mounted at the first end of the interior bore, the pressure sensor operatively connected to send signals to the electronics in response to external fluid pressure, and the pressure sensor being operatively connected to the electronics through conductive paths;
a primary seal mounted at the first end of the interior bore, the primary seal configured to prevent external fluids from entering the interior bore; and
a secondary seal disposed in the interior bore between the pressure sensor and the electronics, the secondary seal comprising a potted seal around exposed portions of the conductive paths.

9. The apparatus of claim 8 further comprising:
a display operatively connected to the electronics, the display being configured to display data received from the electronics.

10. The apparatus of claim 9 wherein the display comprises a digital display.

11. The apparatus of claim 8 wherein the electronics is configured to send output signals corresponding to the external fluid pressure.

12. The apparatus of claim 11 in which the output signals correspond to the external pressure being outside of an adjustable range.

13. The apparatus of claim 8 wherein the pressure sensor comprises a flexible diaphragm mounted on the first end of the interior bore.

14. The apparatus of claim 8 wherein the exposed portions are parts of a junction between wires forming the conductive paths.

* * * * *